(12) United States Patent
Mayer, Jr.

(10) Patent No.: US 10,221,586 B2
(45) Date of Patent: Mar. 5, 2019

(54) FENCING ASSEMBLY SYSTEMS AND METHODS

(71) Applicant: Alabama Metal Industries Corporation, Birmingham, AL (US)

(72) Inventor: Frederic C. Mayer, Jr., Hoover, AL (US)

(73) Assignee: ALABAMA METAL INDUSTRIES CORPORATION

( * ) Notice: Subject to any disclaimer, the term of this patent is extended or adjusted under 35 U.S.C. 154(b) by 0 days.

(21) Appl. No.: 15/886,194

(22) Filed: Feb. 1, 2018

(65) Prior Publication Data

US 2018/0155956 A1  Jun. 7, 2018

Related U.S. Application Data

(63) Continuation-in-part of application No. 15/253,509, filed on Aug. 31, 2016, and a continuation-in-part of application No. 15/876,325, filed on Jan. 22, 2018.

(60) Provisional application No. 62/453,972, filed on Feb. 2, 2017.

(51) Int. Cl.
*E04H 17/26* (2006.01)
*E04H 17/08* (2006.01)
*E04H 17/14* (2006.01)

(52) U.S. Cl.
CPC ......... *E04H 17/261* (2013.01); *E04H 17/08* (2013.01); *E04H 17/1421* (2013.01)

(58) Field of Classification Search
CPC ... E04H 17/1421; E04H 17/16; E04H 17/161; E04H 17/24; E04H 2017/1447; E04H 2017/146; E04H 2017/1473
See application file for complete search history.

(56) References Cited

U.S. PATENT DOCUMENTS

| | | | | |
|---|---|---|---|---|
| 3,022,044 A | * | 2/1962 | Gugino | E04H 17/06 256/47 |
| 4,899,991 A | * | 2/1990 | Brunkan | E04H 17/1434 256/24 |
| 5,556,080 A | * | 9/1996 | Vise | E04H 17/003 248/74.5 |
| 8,631,551 B1 | * | 1/2014 | Payne | E04H 17/143 29/428 |
| 2009/0321701 A1 | * | 12/2009 | Payne | E04H 17/161 256/57 |
| 2011/0062404 A1 | * | 3/2011 | Shepherd | E04H 17/161 256/34 |

FOREIGN PATENT DOCUMENTS

DE  33 11 088  *  9/1984  ............. E04H 17/14

* cited by examiner

*Primary Examiner* — Michael P Ferguson
(74) *Attorney, Agent, or Firm* — Jennifer Meredith, Esq.; Lippes Mathias Wexler Friedman LLP

(57) ABSTRACT

Systems and methods of installing a fencing assembly, the assembly having at least two rail posts; a bracket with a short side strap, a long side strap and a box structure with a return support flange, the bracket is in communication with one of the rail posts, a short side strap hem fits with a portion of the right side hem, a long side strap hem fits with a portion of the left side hem and a fastener is received in the short side opening and the long side opening to attach the bracket to the rail post; at least one cross beam is placed in the cross beam opening of two adjacent rails posts; and a fence panel is attached to the cross beam.

22 Claims, 15 Drawing Sheets

SECTION D-D

SECTION D-D

SECTION E-E

SECTION C-C

SECTION A-A

FENCING ASSEMBLY SYSTEMS AND METHODS

TECHNICAL FIELD

The present disclosure generally relates to perimeter security systems. More particularly, and not by way of limitation, particular embodiments of the present disclosure are directed to a modular and versatile fencing system based on posts with brackets for accepting cross beams for ease of installation and efficient load distribution. The present invention envisions systems and methods that may be utilized to retrofit fence panels to existing rail posts, resulting in substantial installation cost savings and improved strength of the fence.

BACKGROUND

A fence is a structure that encloses an area, typically outdoors. There are many perimeter fencing solutions available in the market. Generally, a fence around a property or area involves installing in the ground a number of posts spaced apart to receive individual connecting rails and fence panels/wires. A fence differs from a wall in that the fence typically does not have a solid foundation along its whole length.

SUMMARY

Current fencing solutions often offer round posts, which are not aesthetically pleasing because posts are integral to a fence system and should integrate with the design instead of sticking out. Furthermore, connecting rails to round posts frequently involves cutting longer lengths of rail pipe and then using clamps to secure the rail at its both ends. Clamping fittings to the post to make mechanical connection of the rails is not aesthetic and is time-consuming. Also, if the post has a hole punched through, water can invade, causing rust or freezing and splitting of the post. The rails may also be scuffed up to the point the powder coated finish of the rails is compromised. Additionally, with larger diameter posts, rails joining at posts are not on the same plane as the face of the framework. This can create a wavy appearance looking down the fence line.

The round posts in traditional fences also pose a problem as to how to give a finished look to line, corner, end, and gate posts. Lack of proper finishing may expose corners and ends of fence lines with spaces for one to begin cutting or climbing.

The individual pieces of rails used for connecting the round posts can reduce the overall strength of the fence against impact. When unwanted breaching occurs, the top rail can become bent, which may compromise the strength of the fence. Furthermore, rails that use sleeves to connect pieces of the rail can physically shift or be forced apart. This not only creates a bad visual appearance, but also reduces the level of security of the barrier.

In addition, the use of washers for fittings or clamping in conventional fences requires a large quantity of washers and does not ensure that the strength is continuous throughout the quantity of washers required.

Still further, the round posts and segmented rails in a traditional fence make it difficult to incorporate impact cables or run electric and optic cables throughout the length of the fence. It is also difficult to incorporate detection devices—such as cameras or monitoring systems—into a traditional fence design.

It is therefore desirable to address the above-mentioned problems of existing fencing systems so that a more robust and secure perimeter fencing may be accomplished. As a solution, the a Retrofit embodiments allow old fences not permitting the required level of security to be retrofitted increasing the level of security. Allows retrofit to change the look of the fence from chain link to welded wire to an architecturally pleasing secure barrier. Retro fitting allows for a plurality of shapes, for instance, 3-sided, 4-sided or round. There may be a Plurality of materials for post, rails and fittings, e.g. ferrous or non-conductive. The present invention places rail and post in compression fit security rail and post, allows rail to adjust allowing for changes in grade. A round hole can be cut in vertical extruded or roll formed post and using an extruded rail with plurality of shapes, for instance, 3-sided, 4-sided or round. (non-conductive fence eights over 20-ft. Retro tall fences to non-conductive). Round rail might have flat side to allow flush mount of panels to rail and allow for threaded fastener. Non-metallic can offer non-conductive properties.

There may also be Infill Panels, which allow for a plurality of fence styles, e.g. pickets, pales or privacy. Panels can fit to inside or outside of vertical structural member allowing for no post penetrations. Locks rails to post. No vibration. Can use a plurality of attachment methods, fasteners, etc.

A retrofit bracket having a box structure with a return support flange prevents rotation, keeps a strap in the correct orientation and allows for use of a light gauge material while better distributing stress loading.

The present invention also envisions new construction embodiments (as opposed to retrofit embodiments) that provide ease of installation, superior strength and enhanced security.

The cross beam may be a hollow rail member and may be substantially rectangular or square in cross-section.

The fencing assembly may further comprise a finish plate to be placed over the slotted post and having a plurality of pre-drilled holes for attaching the finish plate to the slotted post. The finish plate may be made of metal. The finish plate may be directly bolted to a fence panel.

SUMMARY OF THE INVENTION

In one embodiment, a fencing assembly is provided comprising: at least two rail posts; a bracket having a short side strap, a long side strap and a box structure with a return support flange, a left side having a left side hem, a right side having a right side hem, wherein the box structure is between the left side and the right side and having a cross beam opening for receipt of a cross beam, the short side strap having a first flat portion with a short side opening therein for receipt of a fastener, an elongated portion with a short side strap hem, the long side strap having a substantially L shaped portion with a long side opening therein for receipt of a fastener, a curved portion with a long side strap hem; wherein the bracket is in communication with one of the rail posts, the short side strap hem fits with a portion of the right side hem, the long side strap hem fits with a portion of the left side hem and a fastener is received in the short side opening and the long side opening to attach the bracket to the rail post; at least one cross beam placed in the cross beam opening of two adjacent rails posts; and a fence panel attached to the cross beam.

In another embodiment, a method of installing a fence is provided, the method comprising: providing at least two rail posts in the ground with a pre-determined distance therebetween; placing a bracket against one of the at least two rail posts, the bracket having a short side strap, a long side strap, a box structure with a return support flange, a left side having a left side hem, a right side having a right side hem, wherein the box structure is between the left side and the right side and has a cross beam opening for receipt of a cross beam, the short side strap having a first flat portion with a short side opening therein for receipt of a fastener, an elongated portion with a short side strap hem, the long side strap having a substantially L shaped portion with an long side opening therein for receipt of a fastener, a curved portion with a long side strap hem; wherein the bracket is in communication with one of the rail posts, the short side strap hem fits with a portion of the right side hem, the long side strap hem fits with a portion of the left side hem; attaching a fastener in the short side opening and the long side opening to attach the bracket to the rail post; inserting at least one cross beam in the cross beam opening of two adjacent rails posts; and attaching a fence panel to the cross beam.

Thus, the modular fencing system as per the teachings of the present disclosure provides for enhanced aesthetics, an internal return support flange allows for use of lighter gauge material while better distributing stress loading, prevent rotation and keeps a strap in correct orientation, provides ease of installation, and also allows incorporation of impact and electrical/optic cables in the fence system. When fence panels are bolted to the rails, any load or impact to the fence is distributed throughout the entire system, thereby greatly enhancing the strength of the system. Many different types of infill may be used for fence panel sections including, for example, anti-cut and anti-climb mesh options. Diamond Fasteners™ and finish plates provide additional strength to the fencing system. The term Diamond Fastener™ is intended to refer to the metal fastener used to bolt the fencing system.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and layouts have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term may be occasionally interchangeably used with its non-hyphenated version, and a capitalized entry may be interchangeably used with its non-capitalized version. Such occasional interchangeable uses shall not be considered inconsistent with each other.

Figure 1:
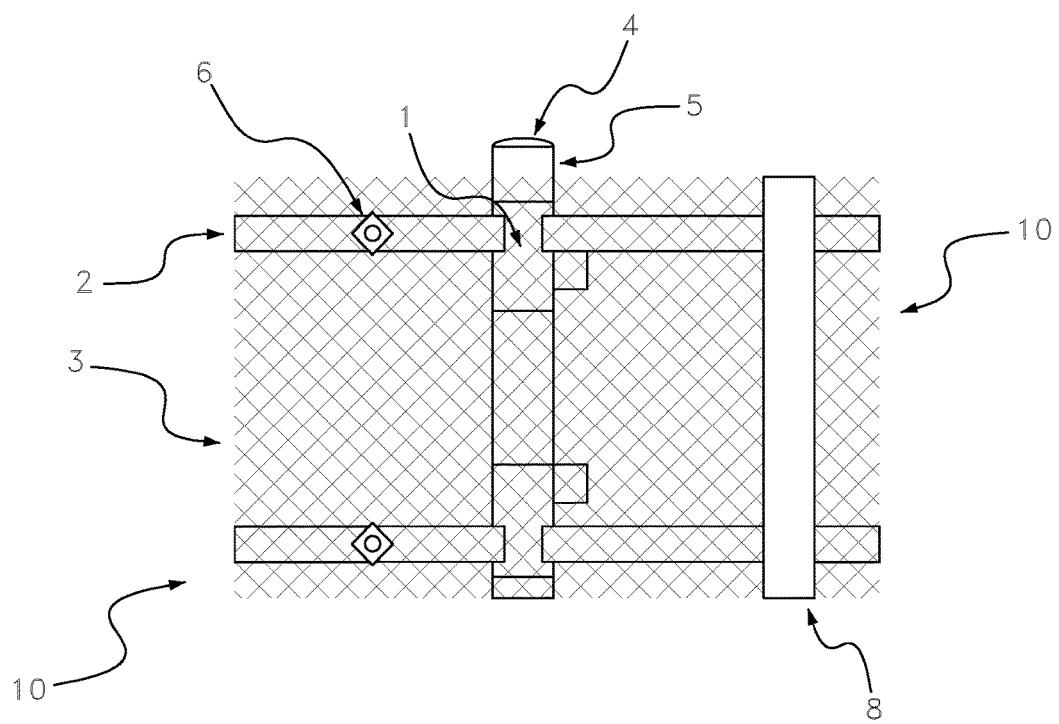
FIG. 1 shows an exemplary fence system according to one embodiment of the present disclosure.
Figure 2:
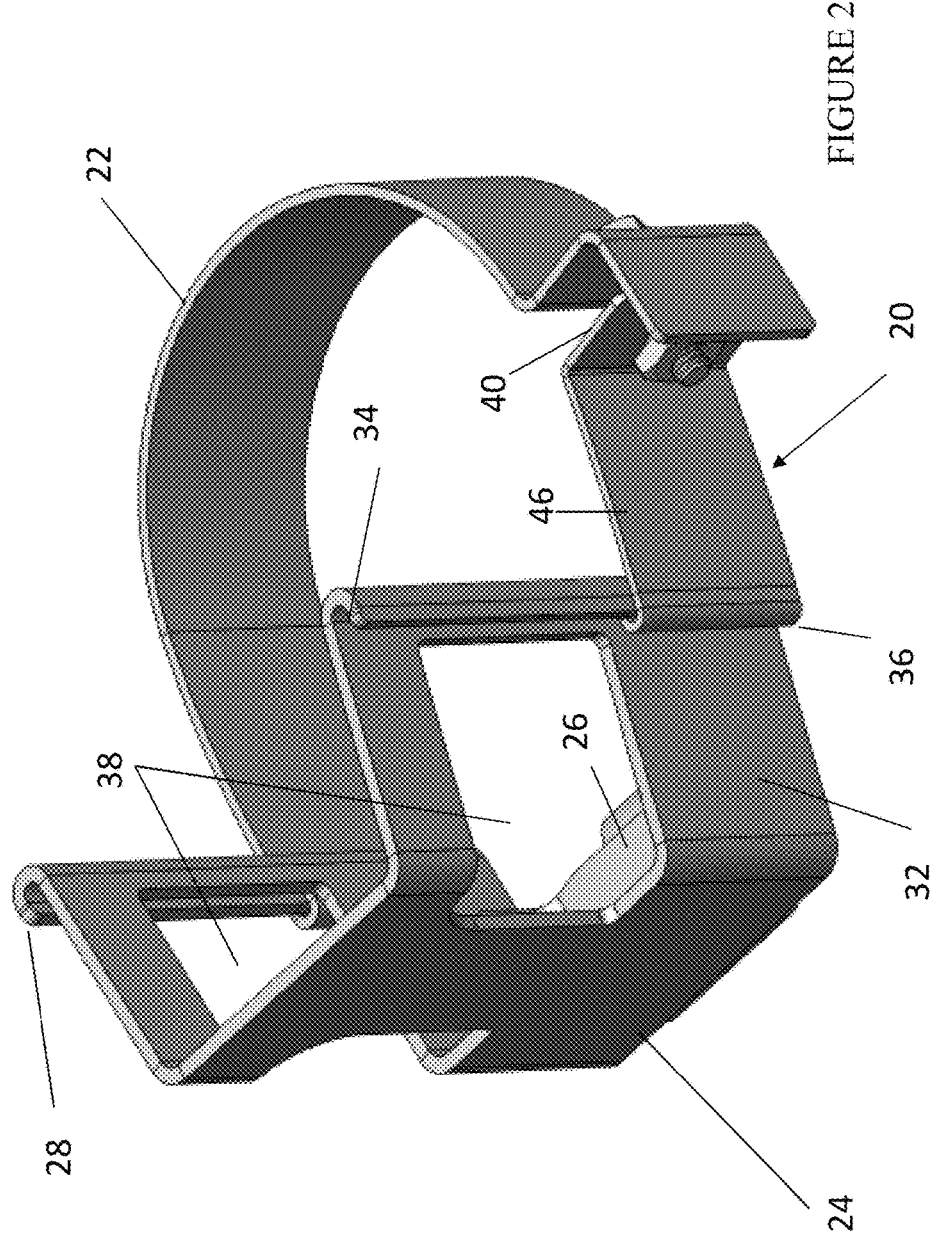
FIG. 2 provides an exemplary perspective view of a bracket as per teachings of one embodiment of the present disclosure.

It is noted that various figures (including component diagrams) shown and discussed herein are for illustrative purpose only, and are not drawn to scale. FIG. 1 shows an exemplary fence system 10 according to one embodiment of the present disclosure. The fence system 10 shown in FIG. 1 may be a portion of a perimeter security system that may be erected surrounding a geographical area. As illustrated, the fence system 10 may include at least two posts (5), a bracket (1), at least one cross beam (2) placed in the cross beam opening of two adjacent rails posts; and a fence panel (3) attached to the cross beam. The rail post may be from an existing fence having fence panels removed. It is noted that one post (5) is depicted, but one of ordianry skill in the art would understand that there may be an number of similarly depicted posts and two posts are required to support the cross beam. The fence panel (3) depicted is a mesh panel attached to the at least one cross beam (2) by a diamond clip with a threaded fastener (6). There may also be a diamond clip on the outside of the fence between the fence panel (3) and a fastener that goes through the cross beam (2) and the fence panel (3). There may also be an attachment plate (8), which is typically used to join adjacent panels to form a fence. The attachment plate (8) is typically placed on top of an outside of adjacent fence panels. The fence panels may be made of any suitable panel material such as mesh, chain link, picket fence, fabric, standard posts.

Figure 4:
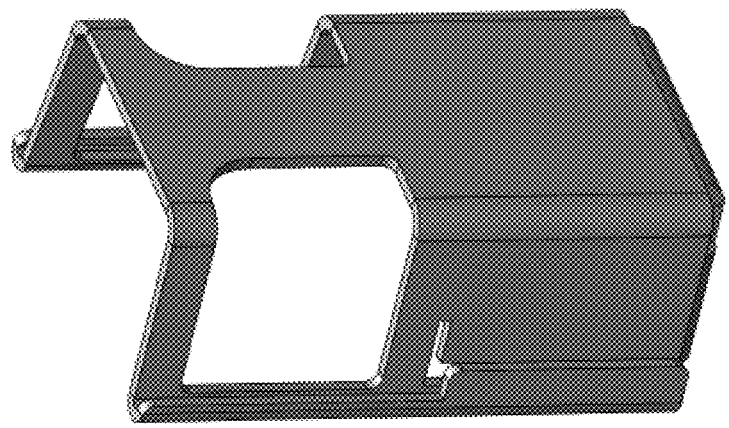
FIGS. 3 and 4 depicts different size rail posts and the bracket of FIG. 2.
Figure 3:
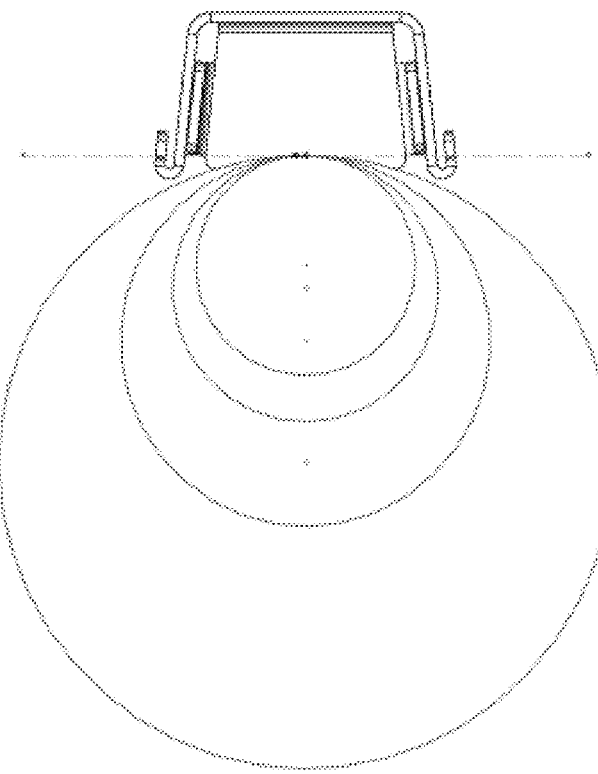
Figures 15, 16, 17:
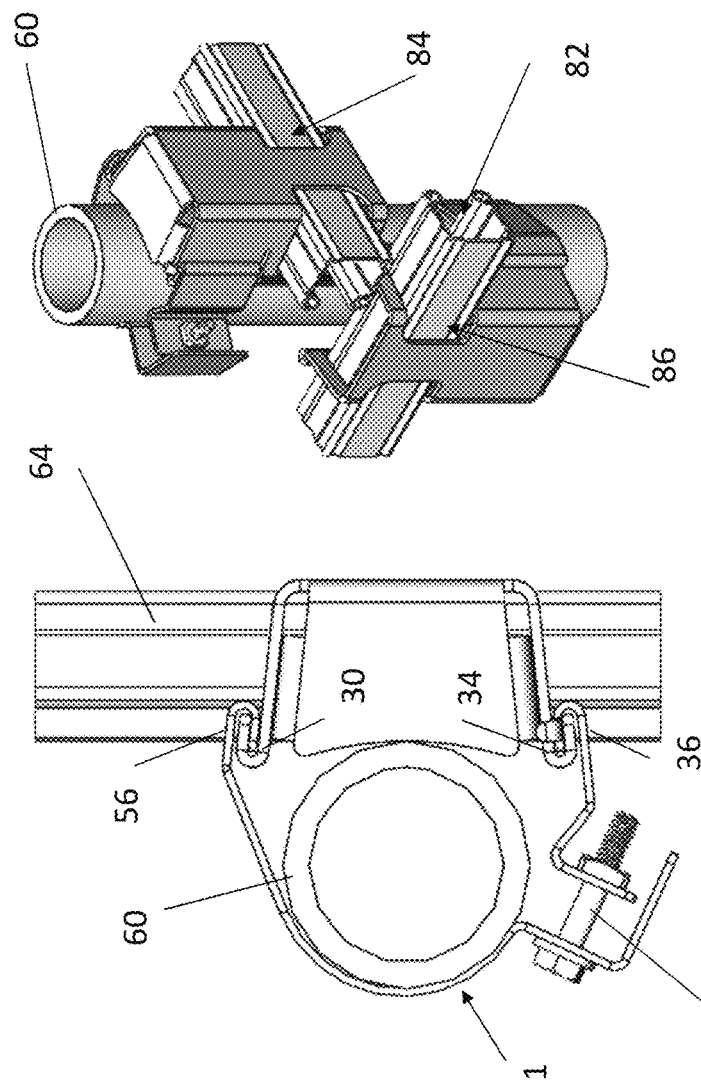
FIGS. 15, 16 and 17 depict different views of the bracket, rail posts and cross beams, including offset cross beams, according to particular embodiments of the present disclosure.
Figure 20:
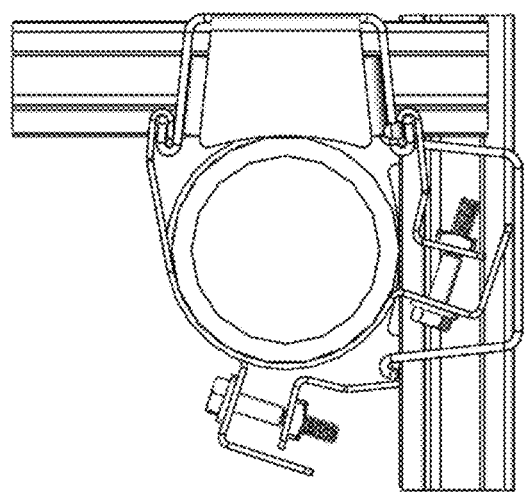
FIGS. 18, 19, 20, 21, 22, 23, 24, 25 and 26 depict different views of the bracket, differing size rail posts and cross beams, including offset cross beams, according to particular embodiments of the present disclosure.
Figure 19:
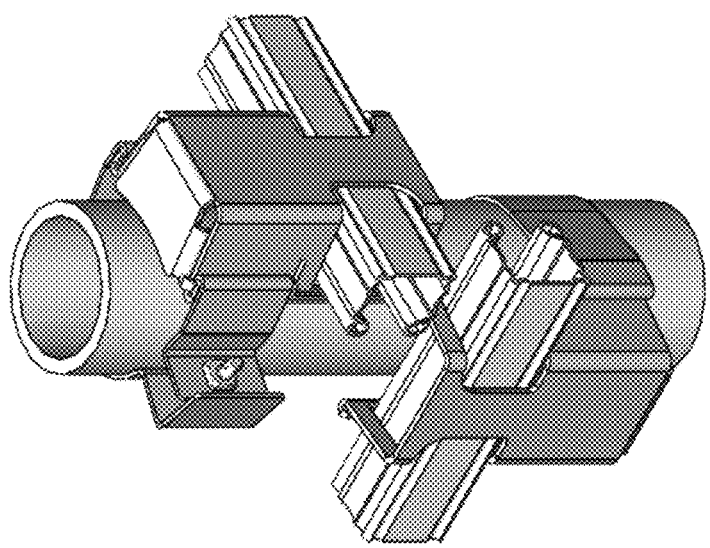
Figure 18:
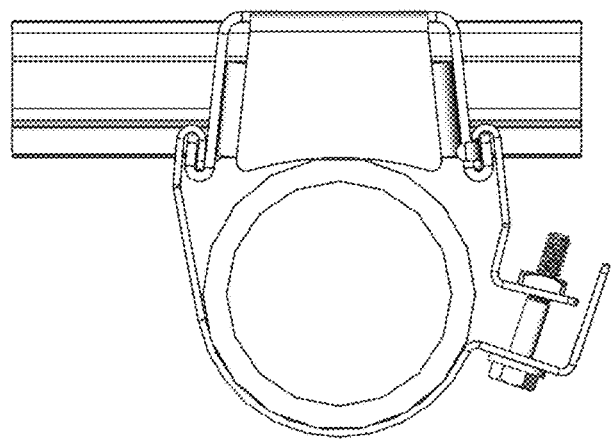
Figure 23:
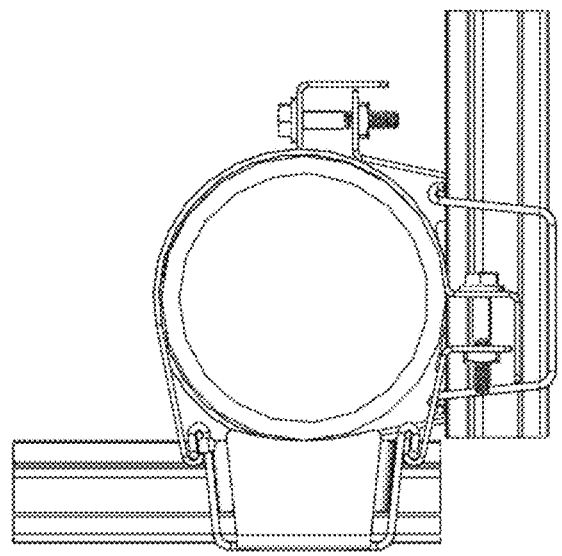
Figure 22:
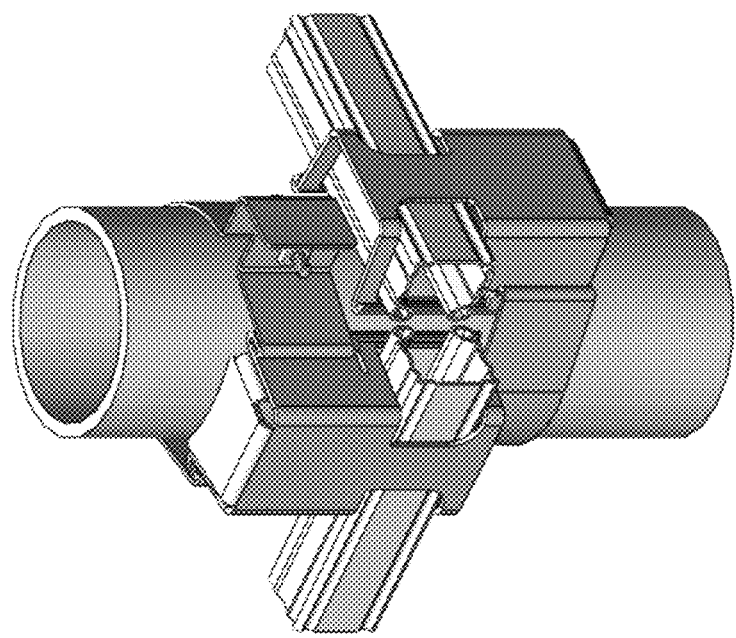
Figure 21:
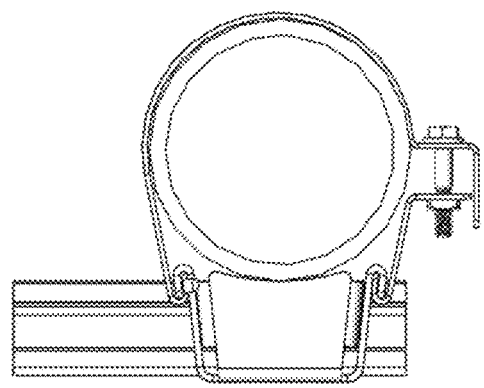
Figure 26:
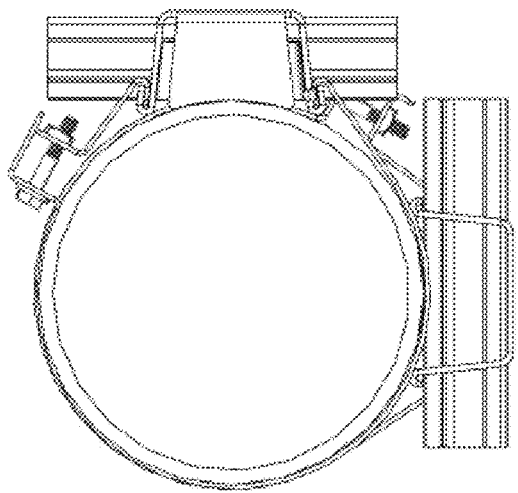
Figure 25:
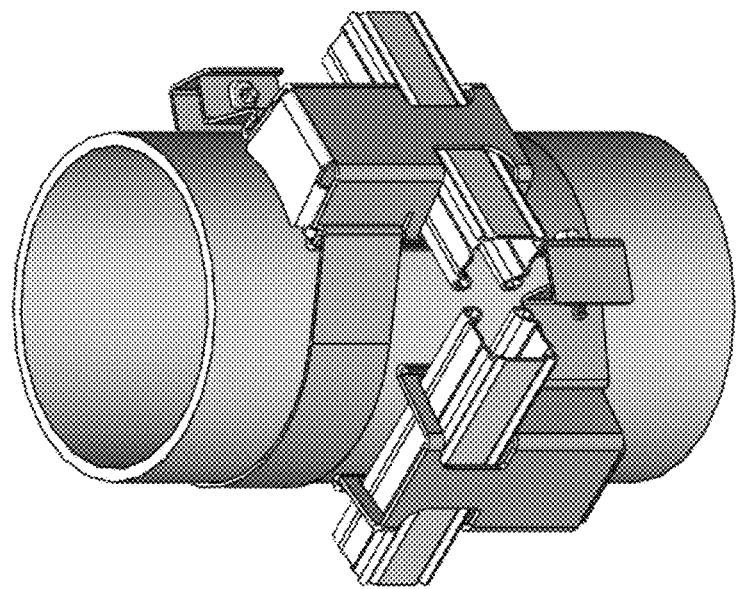
Figure 24:
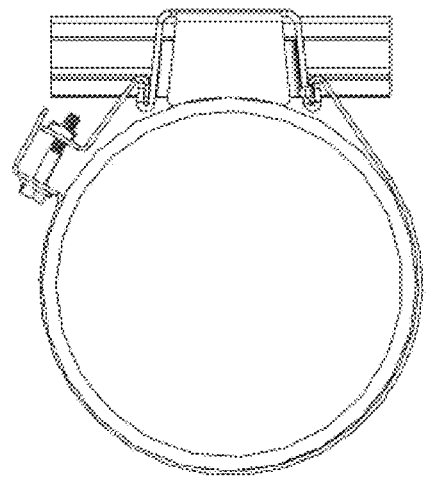
Figure 27:
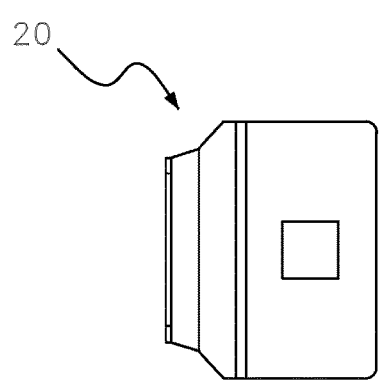
FIGS. 27, 28, 29 and 30 depict a short side strap.
Figure 28:
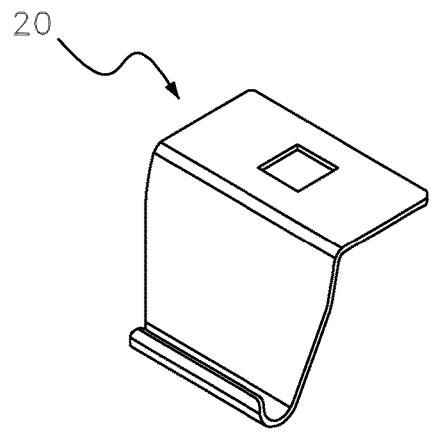
Figure 29:
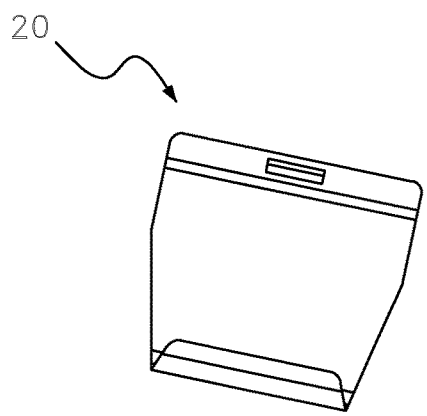
Figure 30:
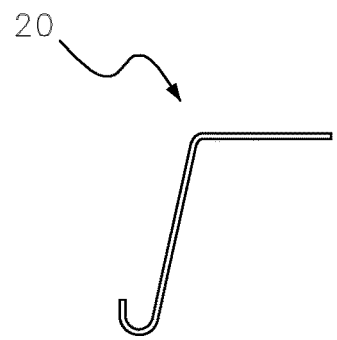
Figure 31:
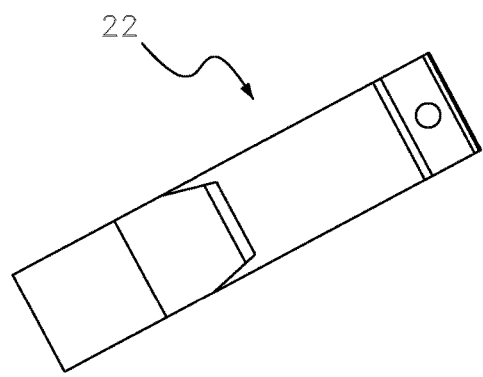
FIGS. 31, 32, 33 and 34 depict a long side strap.
Figure 32:
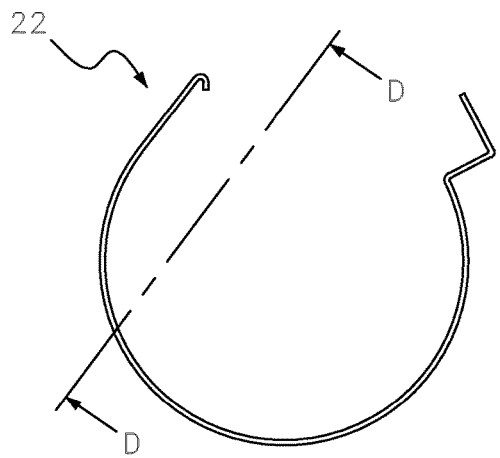
Figure 33:
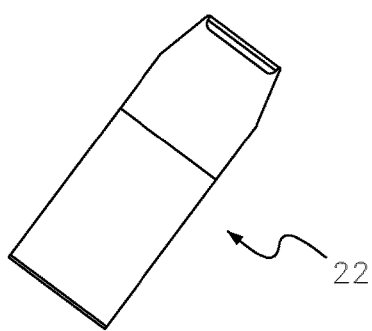
Figure 34:
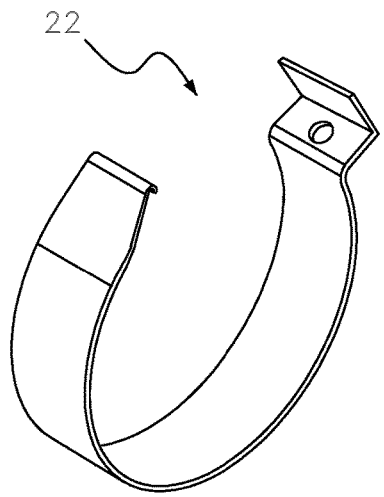
Figure 35:
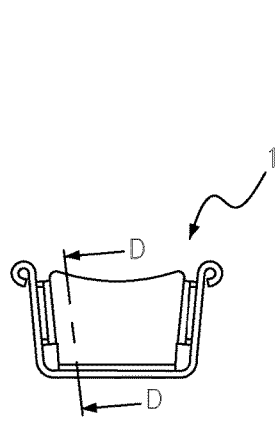
FIGS. 35, 36, 37, 38, 39 and 40 depict a bracket.
Figure 36:
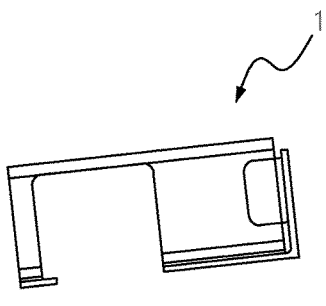
Figure 37:
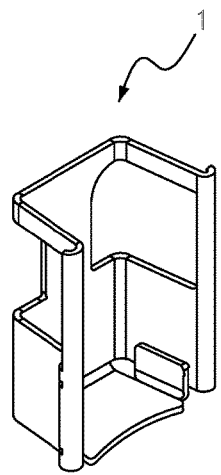
Figure 38:
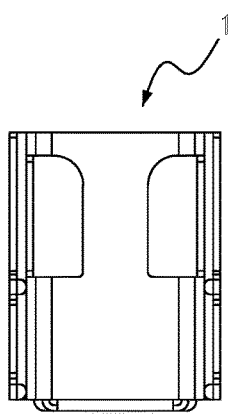
Figure 39:
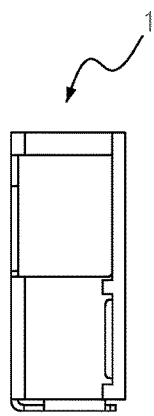
Figure 40:
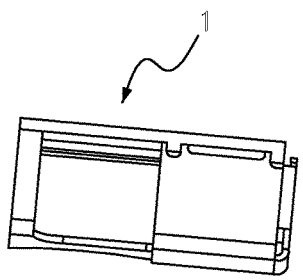
Figure 41:
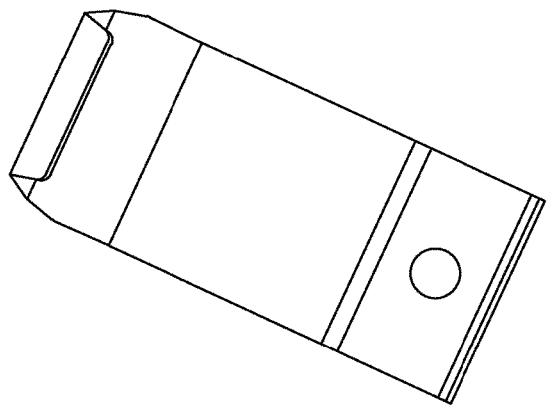
FIGS. 41, 42, 43 and 44 depict a long side strap.
Figure 42:
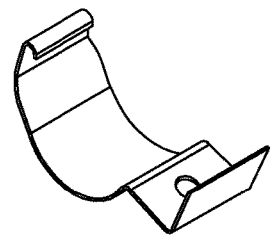
Figure 43:
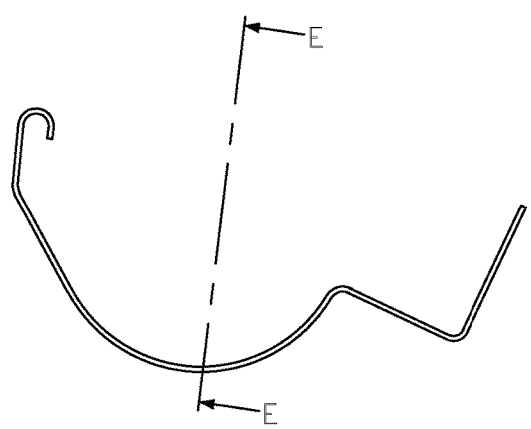
Figure 44:
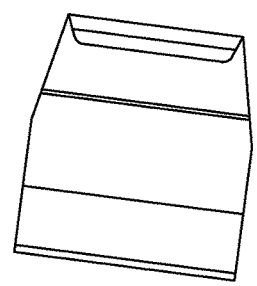
Figure 45:
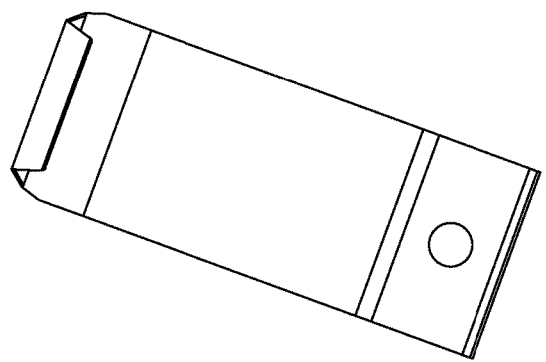
FIGS. 45, 46, 47 and 48 depict a long side strap.
Figure 46:
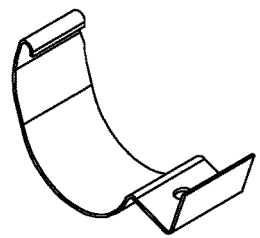
Figure 47:
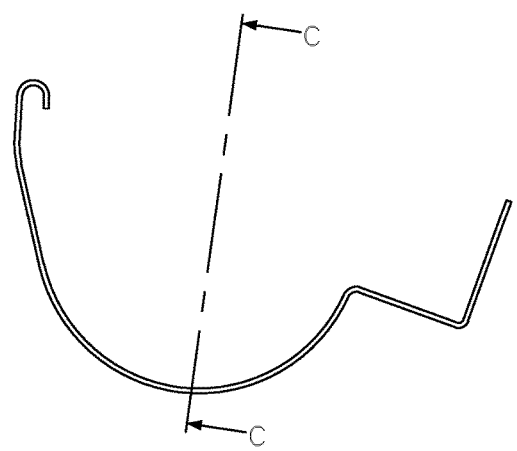
Figure 48:
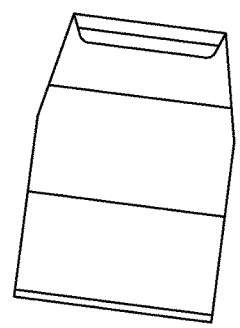
Figure 49:
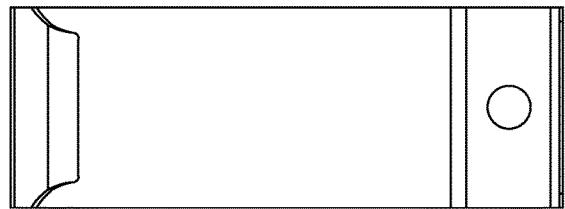
FIGS. 49, 50, 51 and 52 depict a long side strap.
Figure 50:
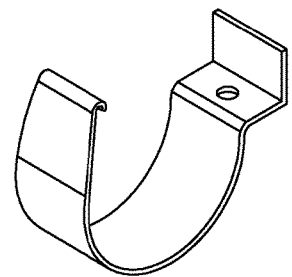
Figure 51:
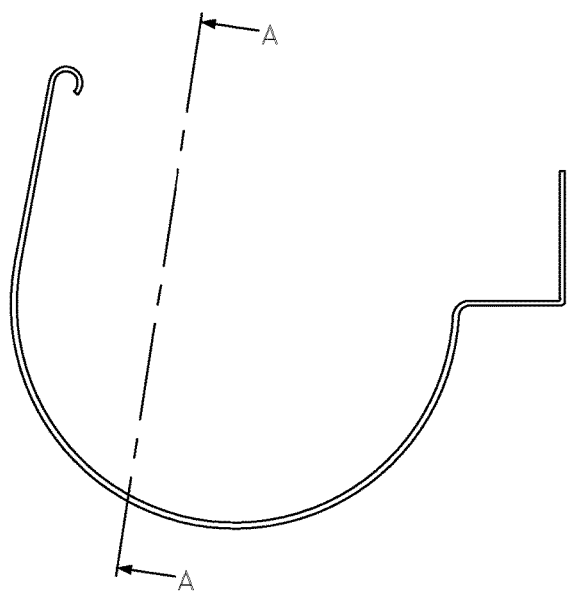
Figure 52:
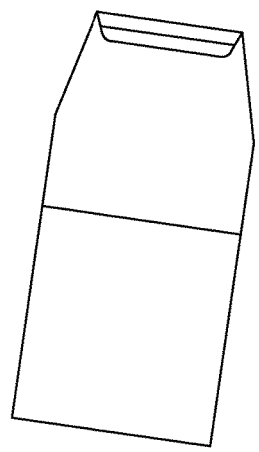

The bracket (1) may have a short side strap (20), a long side strap (22) and a box structure (24) with a return support flange (26), a left side (28) having a left side hem (30), a right side (32) having a right side hem (34), wherein the box structure (24) is between the left side (28) and the right side (32) and having a cross beam opening (38) for receipt of a cross beam (2), the short side strap (20), see also FIGS. 5-9, having a first flat portion (40) with a short side opening (42)

therein for receipt of a fastener. The cross beam opening may be, for example, a substantially square shaped cross beam opening and/or a substantially rectangular shaped cross beam opening. The cross beam may be a hollow cross beam (see FIG. 16, hollow cross beam 82). FIG. 3 depicts that a single bracket may be used for any post diameter, such as 2+3/8, 2+/8, 4 and 6+5/8. FIG. 4 depicts the partially relieved hem, as is required to fit corner case at 4" diameter. FIGS. 3 and 4 depicts the bracket and how the return flange braces against the post.

Figure 5:
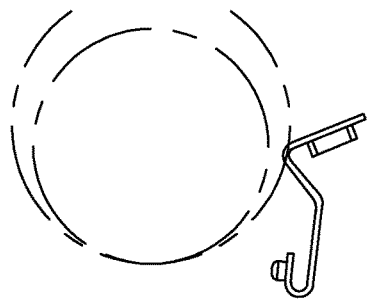
FIGS. 5, 6, 7, 8 and 9 depict a different size posts and short side straps with a bend to accommodate different sizes and a tab.
Figure 6:
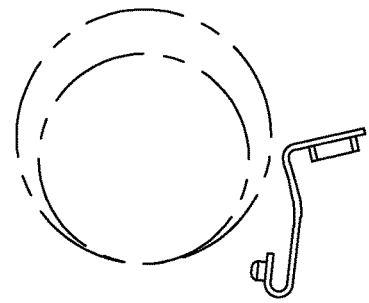
Figure 7:
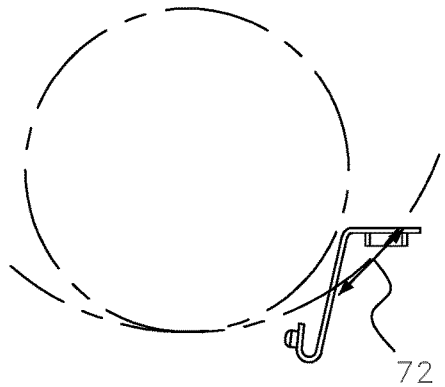
Figure 8:
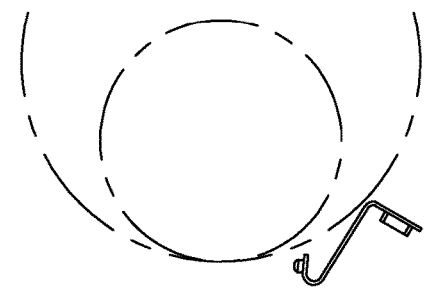
Figure 9:
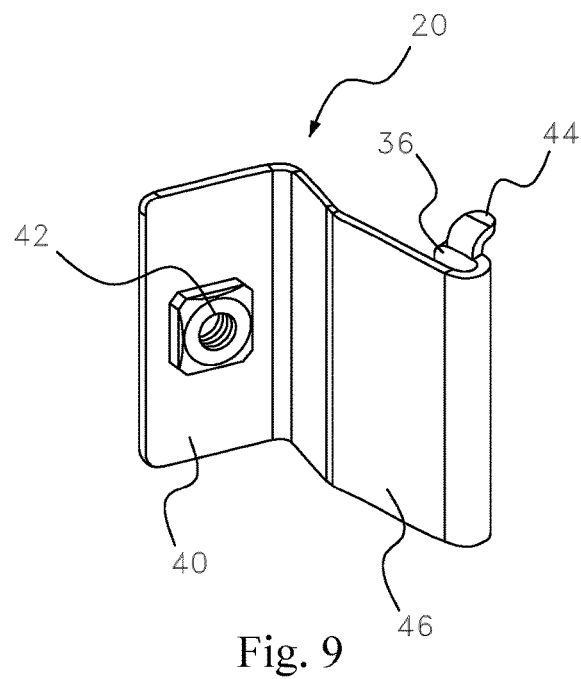
Figure 14:
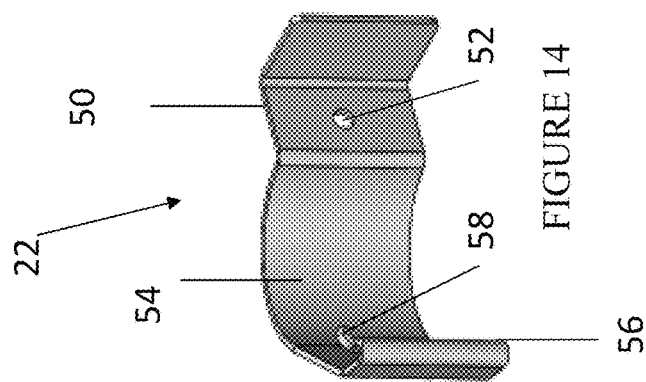
FIGS. 10, 11, 12, 13 and 14 depict a long side strap according to different embodiments of the present disclosure.
Figure 11:
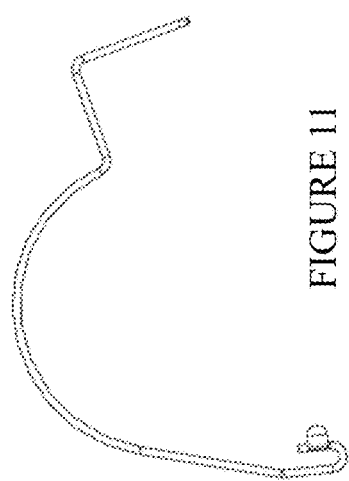
Figure 13:
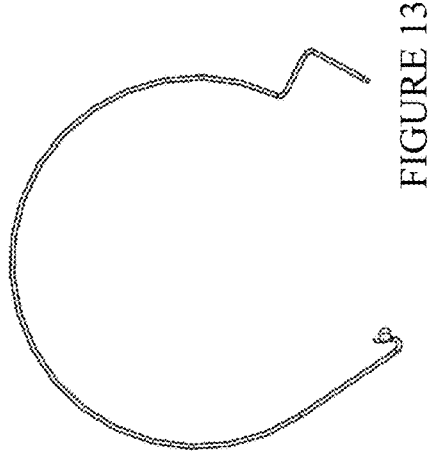
Figure 10:
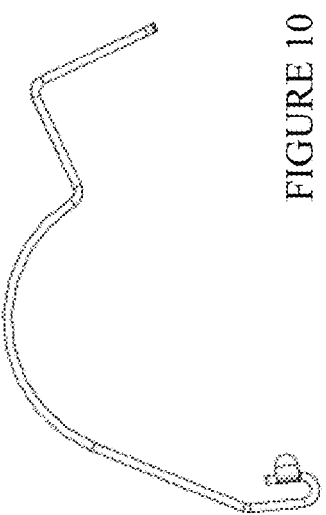
Figure 12:
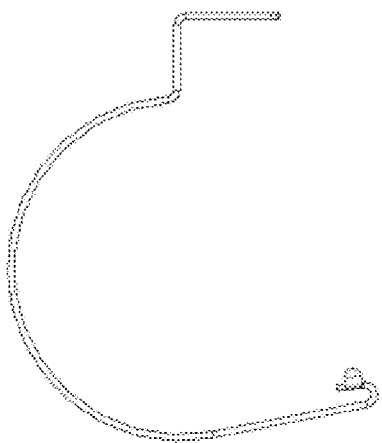

The square and/or rectangular shape allows for increased strength and support and ease of installation. It also prevents buckling of the fence panel. The short side strap (20) may also have a tab (44) that may be bent over to further secure the short side strap (20) to the box structure (24). The short side strap (20) may also have an elongated portion (46) with a short side strap hem (36). The elongated portion (46) of the short side strap (20) may have a bend (72) that is between 10 and 100 degrees according to the size of the rail post. FIG. 5 depicts a 2+3/8" post, FIG. 6 depicts a 2+7/8" post, FIG. 4 depicts a 4" post, FIG. 8 depicts a 6+5/8" post. Bends may be adjusted in the field to fit different posts. The long side strap (22) may have a substantially L shaped portion (50) with a long side opening (52) therein for receipt of a fastener, a curved portion (54) with a long side strap hem (56). The long side strap (22) may also have a tab (58) that may be bent over to further secure the long side strap (22) to the box structure (24). As depicted, for example in FIG. 15, the bracket (1) is in communication with one of the rail posts (60), the short side strap hem (36) fits with a portion of the right side hem (34). The short side strap hem (36) interfits with the right side hem (34). The long side strap hem (56) fits with a portion of the left side hem (30) and a fastener (62) is received in the short side opening (42) and the long side opening (52) to attach the bracket (1) to the rail post (60). The left side hem (30) and the right side hem (34) may be partially relieved hems that run the entire length of the left side (28) and the right side (32). At least one cross beam (64) is placed in the cross beam opening (38) of two adjacent rails posts (5) and a fence panel (3) may be attached to the cross beam. FIG. 18-26 are similar to FIGS. 15-17, but depicts different size posts.

One of the advantages of the present invention is that one of the rail posts may be a corner post (See FIGS. 16, 17, 19, 20, 22 and 23) and two cross beam openings (84, 86) are provided offset on the corner post (60) to provide the cross beams that are inserted in the cross beam openings as offset corner posts. In the example depicted in FIG. 16, the cross beam openings (84, 86) are provided offset at substantially 90 degrees to form a standard corner. It is also envisioned that the cross beam openings may be offset to accommodate any shape fence, not only a corner. In many applications, a fence may not run a straight line, but forms a curve. The offset posts are flexible to allow a myriad of fencing shapes.

The present invention also provides a method of installing a fence, the method comprising: providing at least two rail posts in the ground with a pre-determined distance therebetween; placing a bracket against one of the at least two rail posts, the bracket having a short side strap, a long side strap, a box structure with a return support flange, a left side having a left side hem, a right side having a right side hem, wherein the box structure is between the left side and the right side and has a cross beam opening for receipt of a cross beam, the short side strap having a first flat portion with a short side opening therein for receipt of a fastener, an elongated portion with a short side strap hem, the long side strap having a substantially L shaped portion with an long side opening therein for receipt of a fastener, a curved portion with a long side strap hem; wherein the bracket is in communication with one of the rail posts, the short side strap hem fits with a portion of the right side hem, the long side strap hem fits with a portion of the left side hem; attaching a fastener in the short side opening and the long side opening to attach the bracket to the rail post; inserting at least one cross beam in the cross beam opening of two adjacent rails posts; and attaching a fence panel to the cross beam. The rail post may be from an existing fence having fence panels removed. The step of providing at least two rail posts in the ground with a pre-determined distance therebetween may be done by anchoring the at least two rail posts which are new rail posts. The step of providing at least two rail posts in the ground with a pre-determined distance therebetween may be done by removing at least one of a pre-existing fence panel, a pre-existing bottom tension wire and pre-existing loop caps of an existing fence to provide at least two rail posts which are pre-existing rail posts.

The fence panel (3) may be made of any type of material, thereby allowing a user to customize the system to defend against a wide array of threats. In one embodiment, the fence panel (3) is made of metal, and may be configured to include anti-climb, anti-cut, and many other architectural appearances. In particular embodiments, the posts (5) may be spaced apart in such a manner as to accommodate a mesh panel having a given dimension. For example, if the mesh panel has a dimension of 8×12 ft., the posts may be separated by 8 feet to snugly accommodate the mesh panel 18. Such larger mesh panels help to eliminate seams, unsightly hardware, and reduce installation time.

The post (5) may be typically a solid structure, preferably made of metal for strength, stability, and durability. On the other hand, the cross beam (64) may be a hollow or partially-open structure, preferably of metal and containing a plurality of pre-formed holes to facilitate bolting of a fence panel. In some embodiments, the cross beam (64) rail member may be made of a non-conductive material such as, for example, pultruded reinforced plastic. In different embodiments, the rail members may be of different shapes, thickness, and sizes.

FIGS. 27-30 depict a 4 inch short side strap (20). FIGS. 31-34, 41-44, 45-48 depict a long side strap (22). FIGS. 31-34 depict a 6 inch longside strap. FIGS. 41-44 depicts a 2 inch longside strap. FIGS. 45-48 depict a 3 inch longside strap. FIGS. 49-52 depict a 4 inch longside strap. FIGS. 35-40 depict a bracket (1). The size may vary, these are merely examples of different sizes to show the invention may be utilized in different sizes.

The present invention provides great reduction in the time required to install the fence. Because roughly one third of the entire cost of a fence can be in the installation, any time reduction can equate to substantial savings. The retrofit application also removes the need to pour concrete, as existing rail posts are utilized. This results in savings to the time required, as well as eliminating the need to purchase the rail posts. As mentioned before, the rail design may eliminate many of the cuts, clamps, and connections that are necessary when installing most traditional fences. In some embodiments, the cross beam may be roll formed and may have a highly engineered shape, making it stronger and lighter than traditional rails. The engineered and pre-punched holes may allow for easy attachment of a fence panel, like the fence panel in FIG. 1. On the other hand, in the traditional fences, attaching a mesh to the rails can be difficult using fittings due to the sheer number of fasteners/bolts to secure. The cross beams may tie the entire perimeter security system together stretching the entire length of the fence, thereby not allowing a weak joint in the fence. This may create a continuous curtain wall, greatly improving the structural integrity and ability to absorb impact. The cross beams may create a unitized fence line, which, when impacted, may disburse the force to the adjacent posts down the line, making the fence stronger. Because of their hollow construction, the cross beams may be utilized to run impact, electric, and/or fiber optic cables throughout the fence.

It is noted here that the square or rectangular posts as per teachings of the present disclosure may utilize flat top caps, adding to the engineered appearance of the barrier. Furthermore, the modular approach to fence construction as per teachings of the present disclosure permits easy attachment of detection devices—such as surveillance cameras or security lights—to the flat surfaces of rectangular or square posts. Also, the posts may be easily extended to incorporate such detection devices into the fence design.

As part of the anchoring step, it may be necessary to perform one or more of the following ancillary or preparatory tasks such as, for example: (i) confirming the layout of the eventual fence with appropriate utility company/companies; (ii) completing any grubbing and site preparation; (iii) staking out the layout for the fence and locating corner, end, and gate posts; (iv) digging a terminal post hole that meets the utilities specifications for size and depth; (v) marking locations for other post holes; (vi) stretching a string at a position to set the height of the posts above the grade; (vii) marking (with a marker or crayon) the posts with the depth of embedment plus the height of the string from grade, thereby allowing for the top line of the fence to be consistent; (viii) filling the post hole with concrete, tamping the post into concrete, and checking the distance from post to post; (ix) making sure that the openings in the posts are in the direction of the rails; (x) allowing a post to set at line on post matching with the string height; and (xi) surrounding the posts with concrete in a continuous pour, trowel-finishing around the posts and sloping it downward to direct water away. It is noted here that, as a general rule, the post hole size may be as per the ASTM A567 specification, where the acronym "ASTM" refers to "American Society for Testing and Materials." Thus, for example, the diameter of the post hole may be four times the diameter of the post, and the depth of the hole may be 24 inches plus 3 inches for each 1-foot increase in the height of the fence over four (4) feet. An eight (8) feet fence may generally require 36-inch embedment in concrete.

As discussed before, the cross beam may be slidably inserted. In particular embodiments, fence panels may be connected to the rails using 1⅝" hot dip galvanized carriage bolts and corresponding metallic plate and nut. The fence panels fit in-between posts. In some embodiments, a long, round-shank screw driver may be used to gain leverage in moving fence panels up as needed to maintain the top line of the fence parallel to the grade. All nuts may be hand tightened. In particular embodiments, the outermost attachment points for mesh to rails may utilize a break-away nut to prevent easy removal and unwanted access.

The finish plates may be connected to the posts and mesh panels. In certain embodiments, each type of post—line, end, corner, and gate post—may receive a finish plate. As mentioned before, finish plates may be pre-drilled to assist in locating fastening points. In connecting a finish plate to a post, the top of the plate may be aligned with the top of the post and tamper proof ¼"×1" TEK® screws may be used in certain embodiments to secure the finish plate true and plumb to the post. TEK® screws drill their own hole and then tap threads to combine two or more pieces of material. This is done with nothing more than a standard power drill motor. On the other hand, in some embodiments, the finish plates may be connected to the fence panels using ⅜"×1" hot dip galvanized carriage bolts. In particular embodiments, the splice plates may be Diamond Fasteners™. Final tightening and peening or scarfing of threads may be done after all panels have been installed. As mentioned before, properly-sized post caps may be attached to each post. Also, after the fence system is erected in place, gates and operators may be installed to manufacturer's instructions.

In the preceding description, for purposes of explanation and not limitation, specific details are set forth (such as particular structures, components, techniques, etc.) in order to provide a thorough understanding of the disclosed fencing system. However, it will be apparent to those skilled in the art that the disclosed system may be constructed in other embodiments that depart from these specific details. That is, those skilled in the art will be able to devise various arrangements which, although not explicitly described or shown herein, embody the principles of the disclosed system. In some instances, detailed descriptions of well-known components and construction methods are omitted so as not to obscure the description of the disclosed system with unnecessary detail. All statements herein reciting principles, aspects, and embodiments of the disclosed system, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Alternative embodiments of the fencing system according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features.

The foregoing describes a modular perimeter fencing system in which rail posts are used in conjunction with a bracket to accommodate different shapes, thickness, and sizes to support the fence panels in a manner that creates a unified curtain wall perimeter barrier. For additional strength, each fence panel may also be through-bolted to metallic finish plates, which are mounted on the cross beams for seamless and aesthetically-pleasing look.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:
1. A fencing assembly comprising:
at least two rail posts;
a bracket for each rail post, each bracket comprising:
a short side strap comprising a bent elongated plate having an elongated portion with a short side strap hem and a first flat portion disposed at opposing first and second longitudinal edges thereof, the short side strap hem being bent inwardly along the first longitudinal edge forming a U-shaped cross-section, and the first flat portion being bent outwardly along the second longitudinal edge and having a short side opening therein for receipt of a fastener;

a long side strap comprising a bent elongated plate having a curved portion with a long side strap hem and a substantially L-shaped portion disposed at opposing first and second longitudinal edges thereof, the long side strap hem being bent inwardly along the first longitudinal edge forming a U-shaped cross-section, and the L-shaped portion being bent outwardly along the second longitudinal edge and having a long side opening therein for receipt of a fastener; and a box structure comprising a bent elongated plate having a substantially planar central wall having opposing left and right sidewalls extending from opposing longitudinal ends thereof, and a return support flange disposed at a lower edge thereof, the left sidewall having a left side hem disposed along a longitudinal edge thereof, the right sidewall having a right side hem disposed along a longitudinal edge thereof, the left and right side hems each being bent outwardly along each respective sidewall edge forming a U-shaped cross-section, and wherein the left sidewall and the right sidewall have a pair of aligned cross beam openings for receipt of a cross beam, wherein each bracket is in communication with one of the rail posts, the short side strap hem of each short side strap overlaps a portion of the right side hem of a respective box structure to provide a reciprocal fit, the long side strap hem of each long side strap overlaps a portion of the left side hem of a respective box structure to provide a reciprocal fit, and a fastener is received in the short side opening and the long side opening of each bracket to attach the bracket to the rail post;

at least one cross beam placed in each of the cross beam openings of the respective brackets of two adjacent rail posts; and a fence panel attached to the cross beam.

2. A fencing assembly as in claim 1, wherein the rail posts are from an existing fence having fence panels removed.

3. A fencing assembly as in claim 1, wherein the left side hem and the right side hem are partially relieved hems that run the entire length of the left sidewall and the right sidewall.

4. A fencing assembly as in claim 1, wherein the elongated portion of the short side strap has a bend that is between 10 and 100 degrees according to the size of the rail posts.

5. A fencing assembly as in claim 1, wherein at least one of the short side strap hem and the long side strap hem has a tab portion.

6. A fencing assembly as in claim 1, wherein the fence panel is a mesh panel attached to the at least one cross beam by a diamond clip with a threaded fastener.

7. A fencing assembly as in claim 1, further comprising multiple fencing assemblies to form a fence, wherein an attachment plate is placed on top of an outside of adjacent fence panels.

8. A fencing assembly as in claim 1, wherein the cross beam openings are selected from the group consisting of a substantially square shaped cross beam openings and a substantially rectangular shaped cross beam openings.

9. A fencing assembly as in claim 1, wherein the cross beam is a hollow cross beam.

10. A fencing assembly as in claim 1, wherein one of the rail posts is a corner post and two brackets are provided offset on the corner post to provide cross beams that are inserted in the cross beam openings of the brackets as offset cross beams.

11. A method of installing a fence, said method comprising:

providing at least two rail posts in the ground with a pre-determined distance therebetween;

placing a bracket against each one of the at least two rail posts, each bracket comprising:

a short side strap comprising a bent elongated plate having an elongated portion with a short side strap hem and a first flat portion disposed at opposing first and second longitudinal edges thereof, the short side strap hem being bent inwardly along the first longitudinal edge forming a U-shaped cross-section, and the first flat portion being bent outwardly along the second longitudinal edge and having a short side opening therein for receipt of a fastener;

a long side strap comprising a bent elongated plate having a curved portion with a long side strap hem and a substantially L-shaped portion disposed at opposing first and second longitudinal edges thereof, the long side strap hem being bent inwardly along the first longitudinal edge forming a U-shaped cross-section, and the L-shaped portion being bent outwardly along the second longitudinal edge and having a long side opening therein for receipt of a fastener; and a box structure comprising a bent elongated plate having a substantially planar central wall having opposing left and right sidewalls extending from opposing longitudinal ends thereof, and a return support flange disposed at a lower edge thereof, the left sidewall having a left side hem disposed along a longitudinal edge thereof, the right sidewall having a right side hem disposed along a longitudinal edge thereof, the left and right side hems each being bent outwardly along each respective sidewall edge forming a U-shaped cross-section, and wherein the left sidewall and the right sidewall have a pair of aligned cross beam openings for receipt of a cross beam, wherein each bracket is in communication with one of the rail posts, the short side strap hem of each short side strap overlaps a portion of the right side hem of a respective box structure to provide a reciprocal fit, the long side strap hem of each long side strap overlaps a portion of the left side hem of a respective box structure to provide a reciprocal fit;

attaching a fastener in the short side opening and the long side opening of each bracket to attach the bracket to the rail post;

inserting at least one cross beam in each of the cross beam openings of the respective brackets of two adjacent rail posts; and attaching a fence panel to the cross beam.

12. A method of installing a fence as in claim 11, wherein the rail posts are from an existing fence having fence panels removed.

13. A method of installing a fence as in claim 11, wherein the left side hem and the right side hem are partially relieved hems that run the entire length of the left sidewall and the right sidewall.

14. A method of installing a fence as in claim 11, wherein the elongated portion of the short side strap has a bend that is between 10 and 100degrees according to the side of the rails posts.

15. A method of installing a fence as in claim 11, wherein at least one of the short side strap hem and the long side strap hem has a tab portion.

16. A method of installing a fence as in claim 11, wherein the fence panel is a mesh panel attached to the at least one cross beam by a diamond clip with a threaded fastener.

17. A method of installing a fence as in claim 11, further comprising multiple fencing assemblies to form a fence, wherein an attachment plate is placed on top of an outside of adjacent fence panels.

18. A method of installing a fence as in claim 11, wherein the cross beam openings are selected from the group consisting of a substantially square shaped cross beam openings and a substantially rectangular shaped cross beam openings.

19. A method of installing a fence as in claim 11, wherein the step of providing at least two rail posts in the ground with a pre-determined distance therebetween is done by anchoring the at least two rail posts which are new rail posts.

20. A method of installing a fence as in claim 11, wherein the step of providing at least two rail posts in the ground with a pre-determined distance therebetween is done by removing at least one of a pre-existing fence panel, a pre-existing bottom tension wire and pre-existing loop caps of an existing fence to provide at least two rail posts which are pre-existing rail posts.

21. A method of installing a fence as in claim 11, wherein the cross beam is a hollow cross beam.

22. A method of installing a fence as in claim 11, wherein one of the rail posts is a corner post and two brackets are provided offset on the corner post, further comprising the step of inserting cross beams into the cross beam openings of the brackets to provide offset cross beams.

\* \* \* \* \*